Figures 1, 2:
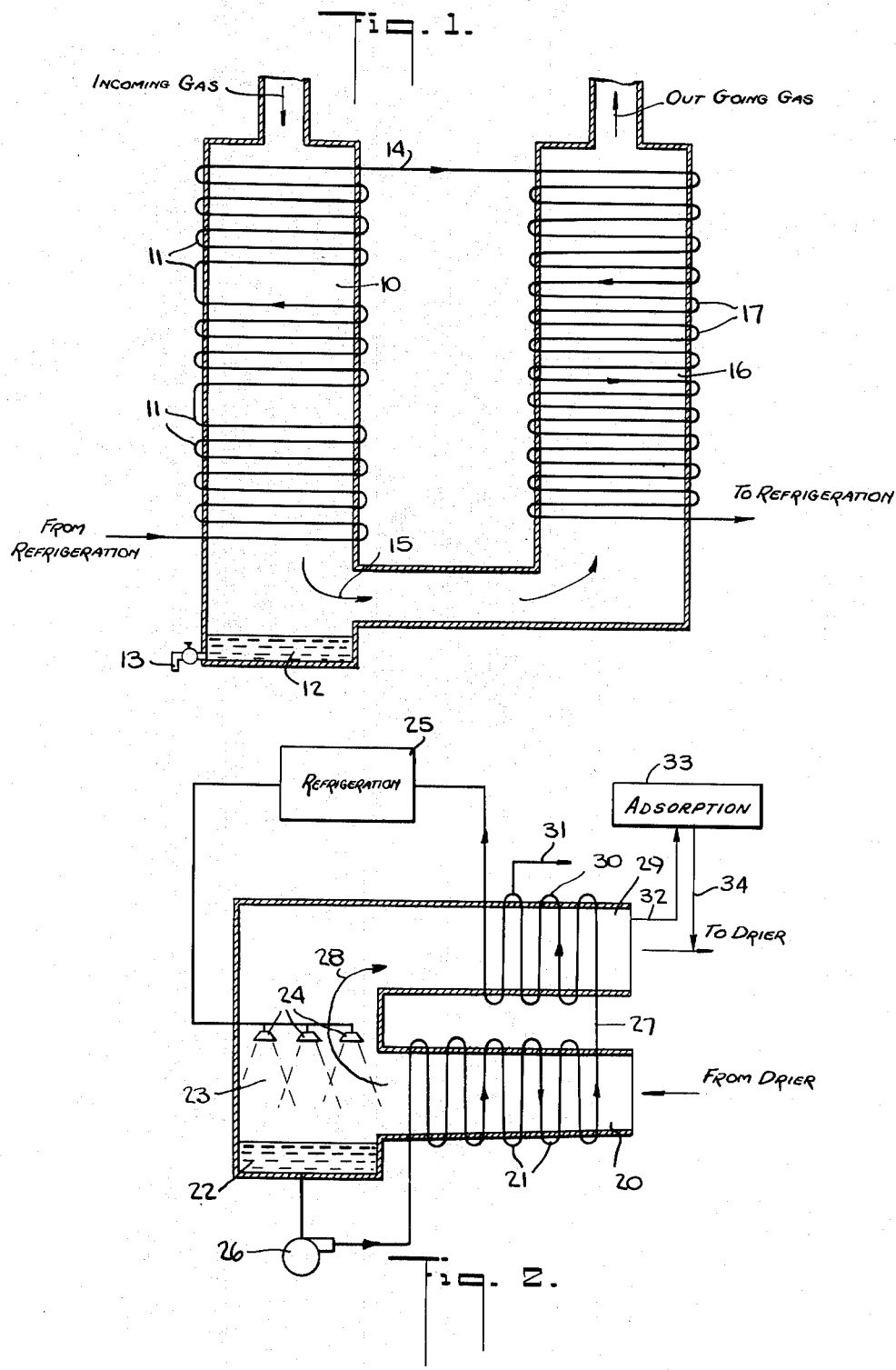

United States Patent Office 3,232,029
Patented Feb. 1, 1966

3,232,029
RECOVERY OF ORGANIC SOLVENTS FROM GASEOUS MEDIA
Wallace R. Evans, Jr., Rock Hill, S.C., assignor to Celanese Corporation of America, New York, N.Y., a corporation of Delaware
Filed Oct. 14, 1960, Ser. No. 62,729
7 Claims. (Cl. 55—71)

This invention relates to the recovery of organic solvents from gaseous media.

During many operations such as the formation of synthetic fibers and films, e.g., cellulose ester fibers, sheet, and films or the application of organic coatings, considerable amounts of organic solvents are evaporated into the atmosphere or other gaseous media. In order to make such processes economically profitable, it is necessary that such evaporated solvents be recovered from the air or other gaseous media.

It is, accordingly, the primary object of this invention to provide a novel process for the recovery of vaporized organic solvents from gaseous media.

It is another object of this invention to provide a novel process for vaporized organic solvent recovery which achieves maximum cooling efficiency in the condensation of such solvents.

It is yet another object of this invention to provide a novel condensation process for the recovery of evaporated organic solvents which makes the heat given off during such processes available for further evaporation of organic solvents.

Other objects and advantages will become apparent from the following detailed description and claims, wherein all parts are by weight unless otherwise specified.

According to one aspect of this invention, the vaporized solvent is recovered by first refrigerating a fluid coolant, then bringing said coolant into heat transferring relationship with the vaporized solvent-carrying gaseous medium whereby sufficient heat is transferred to said coolant from said gaseous medium to condense said vaporized solvent and then subsequent to said condensation bringing said heated coolant into heat transferring relationship with the remaining cooled gaseous medium whereby heat is retransferred from said coolant to said gaseous medium to reduce the amount of refrigeration which will be necessary to recool said coolant. This retransfer of heat reheats the remaining gaseous medium which may again be used to evaporate solvent during a drying operation.

The coolant may be any conventional refrigeratable fluid coolant such as brine, glycols, alcohols, and oils, or it may have the same composition as the solvent which is being recovered, such as methylene chloride and trichloroethylene.

The heat transferring relationship between the coolant and vapor-containing gaseous medium or the remaining gaseous medium may be achieved by any conventional method such as by passing the gaseous medium between a series of coils such as finned coils through which the coolant is flowing counter-current to the flow of said gaseous medium. Other means which may be used to achieve heat transfer include shell and tube exchangers, plate, plate coil, and finned plate exchangers.

In accordance with another and preferable aspect of this invention, the condensation of the vaporized solvent is achieved by bringing said coolant into direct contact with said gaseous medium. This may be advantageously accomplished by spraying said refrigerated coolant into said gaseous medium to condense and carry off or entrain said vaporized solvent as a coolant-solvent admixture. When this spray condensation process is used, the coolant preferably comprises the organic solvent composition in the liquid state. This avoids the need to completely separate the condensed solvent from coolant prior to the rerefrigeration of the coolant since the condensed solvent forms part of the coolant.

If desired, the sprayed coolant may contain a liquid absorbent for the vaporized solvent such as light mineral oil.

In the drawings which illustrate this invention:

FIG. 1 diagrammatically shows one embodiment of this invention.

FIG. 2 diagrammatically shows another embodiment of this invention.

Referring now to FIG. 1, an incoming gaseous medium carrying a vaporized organic solvent which was evaporated in a drying device is flowed through condensation chamber 10, in which said gaseous medium comes in contact with coils 11, through which a refrigerated coolant flows counter-current to the flow of the gas. Sufficient heat is transferred from said gas to said coolant to condense the vaporized organic solvent. The condensed solvent collects in receptacle from which it may be withdrawn through tap 13. Due to the heat transferred during the condensation, the coolant exiting chamber 10 at 14 is at a higher temperature than the gas exiting said chamber at 15. This exiting gas is then passed through heat transfer chamber 16 while the exiting coolant is passed through coils 17 counter-current to the flow of gas through chamber 16. Heat is now retransferred from the coolant to the gas, thereby cooling the coolant which then is rerefrigerated prior to being recirculated. The heated remaining gas may then be recycled to the drying device.

FIGURE 2 discloses a more preferred embodiment of this invention. An incoming gaseous medium carrying a vaporized organic solvent which was evaporated in a drying device is passed through heat transfer chamber 20, in which said gaseous medium comes into contact with coils 21, through which a coolant flows counter-current to the flow of the gas through chamber 20. Heat is transferred from said gas to said coolant resulting in a cooling of the gas and some condensation of the vaporized solvent. The floor of chamber 20 is inclined so that condensed solvent flows into receptacle 22. The gas is then passed into condensation chamber 23 where it is subjected to a spray of coolant from sprayers 24, said coolant having been previously refrigerated by refrigeration means 25. The coolant preferably comprises the organic solvent composition in the liquid state. The organic solvent condenses and is incorporated into the coolant accumulating in receptacle 22. From receptacle 22, the coolant is driven by driving means such as a pump 26 through coils 21 where it undergoes the previously described heat transfer with the incoming gas from the drier. Due to the heat transfer in chamber 20 and in condensation chamber 23, the coolant exiting chamber 20 at 27 is at a higher temperature than the gas exiting condensation chamber 23 at 28. This exiting gas is then passed through heat transfer chamber 29 where the exiting coolant is passed through coils 30 counter-current to the flow of gas through chamber 29. Heat is now retransferred from the coolant to the gas, thereby cooling the coolant which is then recycled to refrigeration means 25 prior to being recirculated. The heated remaining gas leaving chamber 29 may then be recycled to the drying device. Solvent may be removed from the coolant circulatory system at any point by any suitable means such as tap 31.

The remaining gas (the gas leaving chamber 29) after the condensation and removal therefrom of the solvent may still contain residual amounts of solvent. If desired, residual solvent may be removed from this gas by passing a portion of the gas leaving chamber 29 through line 32 into chamber 33 containing an adsorbent such as activated carbon to adsorb the solvent vapors after which such portion of the gas may be returned to the drier through line 34. The solvents may then be recovered from the adsorbent e.g. as set forth in U.S. Patent 2,856,331.

It has been found that the most advantageous results are achieved if the rate of flow of the coolant is such that the temperature of the coolant at the point where it is first brought into contact with the remaining gas to reheat said gas before the gas leaves the recovery system (the temperature of the coolant at points 14 and 27 of FIGS. 1 and 2 respectively) is preferably not more than 50° F. below the temperature of the fresh gas entering the system and most preferably not more than 10° F. below the temperature of the entering gas. This will insure that the gas exiting the system will be at a temperature sufficiently high that it may be efficiently used to again evaporate solvent during a drying operation.

It has been further found that highly advantageous results are achieved if the rate of flow of the coolant is such that the temperature of the coolant leaving the refrigeration means is from 40° F. to 130° F. below the temperature of the coolant entering the refrigeration means and most preferably from 70° F. to 130° F. below the entering coolant. These relatively large temperature differences are made possible by the use of multiple stage refrigeration which cools the coolant in stages or a few degrees at a time. Multiple stage refrigeration results in a considerable saving of mechanical energy. For example, it has been found that in the process of this invention when cooling the coolant from 56° F. to −20° F. if a two stage refrigeration (1st stage from 56° F. to 14° F. and 2nd stage from 14° F. to −20° F.) is used, there is a 33% decrease in required horsepower per ton over the use of a one stage refrigeration system.

In the practice of this invention, it is preferable to use a multiple stage refrigeration system in which the coolant passes through a series of coolers, each cooler lowering the temperature of said coolant a portion of the whole temperature decrease to be effected. Each cooler has operatively associated therewith a compressor for compressing the refrigerant to be passed through the cooler in which said refrigerant expands to cool the coolant and a liquid cooled condenser to remove the heat given up by the compression of the refrigerant. In such a multistage refrigeration system, it is most efficient, if a portion of the compressed refrigerant of each stage is used for cooling the condenser of the next succeeding (lower temperature) stage, as by expanding said compressed refrigerant around said condenser.

The process of this invention has been found to be particularly effective in the recovery of the solvent mixture of methylene chloride and a lower alkanol used as solvents for cellulose esters such as cellulose acetate.

The examples which follow will serve to further illustrate this invention:

EXAMPLE I

Using the apparatus shown in FIG. 2, a mixed gaseous stream from a cellulose acetate drier is passed through heat transfer chamber 20 at the rates of 304 lbs. of methanol, 342 lbs. of methylene chloride, 39.7 lbs. of water vapor and 8265 lbs. of air per hour. The entering stream has a temperature of 150° F. The gas stream leaving chamber 20 has a temperature of 0° F. The stream is next passed into condensation chamber 23 where it is subjected to a continuous spray of a coolant of 66 parts of methylene chloride, 226 parts of methanol, and 39 parts water at −20° F. and sprayed at the rate of 11.35 gallons/minute. The methanol and the methylene chloride vapors condense and are incorporated into the coolant which collects in receptacle 22. The rates of the gases leaving chamber 23 are 77 lbs. of methanol per hour, 276 lbs./hour of methylene chloride, 1 lb./hour of water, and 8265 lbs./hour of air. The temperature of the exiting gas is −4° F. The coolant containing the condensed vapors and having a temperature of −18° F. is driven by driving means 26 through coils 21 at the rate of 11.35 gallons per minute where said coolant removes heat from incoming gases. The temperature of the coolant and condensed vapor mixture leaving chamber 20 is 130° F. The coolant-condensed vapor mixture is then passed through coils 30 where it gives up heat to the gases passing through chamber 29. The temperature of the coolant-condensed vapor mixture leaving coils 30 is lowered to 56° F. while the temperature of the gaseous stream leaving chamber 29 is raised to 110° F. The coolant-condensed vapor mixture is continually removed at the rate of .715 gallon/min. from tap 31 for solvent recovery. The gaseous stream from chamber 29 containing 77 parts of methanol, 276 parts of methylene chloride, 1 part of water, and 8265 parts of air per hour is recycled to the cellulose acetate tow drier.

EXAMPLE II

Using the apparatus shown in FIG. 2, a mixed gaseous stream from a cellulose acetate tow drier is passed through heat transfer chamber 20 at the rates of 263 lbs./hour of methanol, 362 lbs./hour of methylene chloride, 23.9 lbs./hour of water vapor and 7665 lbs./hour of air. The entering stream has a temperature of 150° F. The stream leaving chamber 20 has a temperature of 0° F. The stream is next passed into condensation chamber 23 where it is subjected to a continuous spray of a coolant of 60 parts of methylene chloride, 188 parts of methanol and 23 parts of water at −20° F. and sprayed at the rate of 10.5 gallons per minute. Part of the methanol and methylene chloride vapors condense and are incorporated into the coolant which collects in receptacle 22. The rates of the gases leaving chamber 23 are 75 lbs. of methanol per hour, 302 lbs./hour of methylene chloride and 7665 lbs./hour of air. The temperature of the exiting gas is −4° F. The coolant containing the condensed vapors having a temperature of −18° F. is driven by driving means 26 through coils 21 at the rate of 10.75 gallons/minute where it removes heat from incoming gases. The temperature of the coolant and condensed vapor mixture leaving chamber 20 is 130° F. The coolant-condensed vapor mixture is then passed through coils 30 where it gives up heat to the gases passing through chamber 29. The temperature of the coolant-condensed vapor mixture leaving coils 30 is lowered to 53° F. while the temperature of the gaseous stream leaving chamber 29 is raised to 110° F. The coolant-condensed vapor mixture is continually removed at the rate of 0.6 gallon/minute from tap 31 for solvent recovery. The gaseous stream leaving chamber 29 has the same rate as the stream entering said chamber. 73% of the gaseous mixture leaving chamber 29 is recycled to the cellulose acetate tow drier while the remaining 27% is passed through activated carbon to adsorb any residual methanol and methylene chloride.

It is to be understood that the foregoing detailed description is given merely by way of illustration and that many variations may be made therein without departing from the spirit of my invention.

Having described my invention what I desire to secure by Letters Patent is:

1. A continuous process for the recovery of a vaporized organic solvent comprising methylene chloride from a gaseous medium which comprises continuously refrigerating a liquid coolant comprising said solvent in the liquid state, continuously bringing said coolant into direct contact with said gaseous medium to condense and entrain said vaporized solvent and to heat said coolant, continuously bringing said condensed solvent-containing coolant into heat transferring relationship with said gaseous medium prior to said direct contact to effect a preliminary cooling of said medium, then continuously bringing said condensed solvent-containing coolant into heat transferring relationship with said gaseous medium subsequent to the condensation of the vaporized solvent from said gaseous medium to heat said gaseous medium and cool said coolant and continuously rerefrigerating said coolant.

2. The process set forth in claim 1 wherein a portion of the coolant is continuously withdrawn subsequent to condensation of the vaporized solvent to provide recovered solvent.

3. The process set forth in claim 1, wherein the temperature of the coolant subsequent to rerefrigeration is from 50° F. to 110° F. cooler than the temperature of the coolant prior to rerefrigeration.

4. The process set forth in claim 1, wherein the temperature of said coolant immediately after contact with said gaseous medium to effect preliminary cooling of said gaseous medium is at most 50° F. below the temperature of said gaseous medium prior to preliminary cooling.

5. The process set forth in claim 1 wherein said coolant is brought into direct contact with said gaseous medium by spraying said coolant into said gaseous medium.

6. The process set forth in claim 5 wherein a portion of the coolant is continuously withdrawn subsequent to the condensation of the vaporized solvent to provide recovered solvent.

7. A process for the recovery of vaporized organic solvent comprising an admixture of methylene chloride and a methanol from a gaseous medium which process comprises refrigerating a liquid coolant comprising said solvent in the liquid state, bringing said coolant into contact with said gaseous medium to condense and entrain at least a portion of said vaporized admixture, withdrawing a portion of said coolant to provide recovered solvent, retransferring heat from said coolant to the remaining gaseous medium, bringing at least a portion of said remaining gaseous medium into contact with an adsorbent to adsorb the methylene chloride and the methanol and removing the adsorbed residual methylene chloride and the methanol from said adsorbent.

References Cited by the Examiner

UNITED STATES PATENTS

| | | | |
|---|---|---|---|
| 229,750 | 7/1880 | Portner | 62—93 |
| 1,331,105 | 2/1920 | Guye. | |
| 1,560,950 | 11/1925 | Thiele | 55—27 |
| 1,853,236 | 4/1932 | Shadle | 62—93 |
| 2,083,396 | 6/1937 | Philipp. | |
| 2,166,813 | 7/1939 | Gibson | 62—176 |
| 2,399,205 | 4/1946 | Campbell. | |
| 2,760,594 | 8/1956 | Browning et al. | 55—198 |
| 2,762,449 | 9/1956 | Sweeney | 55—27 |
| 2,899,012 | 8/1959 | Davis | 55—89 |

FOREIGN PATENTS

| | | |
|---|---|---|
| 808,110 | 11/1936 | France. |
| 468,931 | 7/1937 | Great Britain. |

REUBEN FRIEDMAN, *Primary Examiner.*

HARRY B. THORNTON, HERBERT L. MARTIN, RICHARD A. O'LEARY, *Examiners.*